(12) United States Patent
Chee et al.

(10) Patent No.: US 7,978,448 B2
(45) Date of Patent: Jul. 12, 2011

(54) HYBRID CIRCUIT FOR CIRCUIT PROTECTION AND SWITCHING

(75) Inventors: Yuen Hui Chee, Sunnyvale, CA (US);
Thomas H. Lee, Burlingame, CA (US);
Bendik Kleveland, Santa Clara, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 995 days.

(21) Appl. No.: 11/842,043

(22) Filed: Aug. 20, 2007

(65) Prior Publication Data

US 2009/0052099 A1      Feb. 26, 2009

(51) Int. Cl.
*H02H 9/00*      (2006.01)
(52) U.S. Cl. .......................................................... 361/56
(58) Field of Classification Search ....................... 361/56
See application file for complete search history.

(56) References Cited

U.S. PATENT DOCUMENTS

| | | | |
|---|---|---|---|
| 5,301,081 A * | 4/1994 | Podell et al. ..................... 361/56 |
| 5,430,602 A * | 7/1995 | Chin et al. ....................... 361/212 |
| 6,034,552 A | 3/2000 | Chang et al. | |
| 6,355,959 B1 | 3/2002 | Vashchenko et al. | |
| 6,407,445 B1 | 6/2002 | Vashchenko et al. | |
| 7,002,220 B1 | 2/2006 | Jin et al. | |
| 7,067,852 B1 | 6/2006 | Vashchenko et al. | |
| 7,098,717 B2 | 8/2006 | Watt | |
| 7,102,862 B1 * | 9/2006 | Lien et al. ........................ 361/56 |
| 7,129,589 B2 | 10/2006 | Behzad | |
| 7,616,414 B2 * | 11/2009 | Marholev ......................... 361/56 |
| 2003/0016479 A1 * | 1/2003 | Song ................................. 361/56 |
| 2003/0231446 A1 * | 12/2003 | Leete ............................... 361/56 |

* cited by examiner

*Primary Examiner* — Jared J Fureman
*Assistant Examiner* — Nicholas Ieva
(74) *Attorney, Agent, or Firm* — King & Spalding L.L.P.

(57) ABSTRACT

A hybrid circuit (42) for use with communications transceivers. The hybrid circuit (42) combines the function of an ESD protection circuit (12) with the function of a TX/RX switch (10). The input node of the hybrid circuit (42) is connecting between the source of an ESD event (60) and a device to be protected (44). The hybrid circuit (42) includes an ESD protection element (50), which is triggered by a triggering transistor (52). The gate of the triggering transistor (52) is connected to a driver (54) for turning the triggering transistor (52) on during transmission and for turning the triggering transistor (52) off during reception.

18 Claims, 10 Drawing Sheets

HYBRID CIRCUIT FOR CIRCUIT PROTECTION AND SWITCHING

FIELD OF THE INVENTION

The present invention relates to circuit protection and switching, and more specifically to a hybrid circuit for combining circuit protection with switching functions.

BACKGROUND OF THE INVENTION

Transceivers are used in a wide range of communications applications that require the transmission and reception of electromagnetic signals. Such transmission and reception may be accomplished over various wireless and fixed communications channels. Examples of wireless applications of transceivers include but are not limited to cellular telephones, cordless telephones and two-way radios. Examples of fixed-line applications of transceivers include but are not limited to local area networks, cable systems and optical fiber systems.

Transceivers that utilize time-division multiplexing generally require a transmit/receive (TX/RX) switch to isolate the transceiver's receiver from its transmitter during reception and to isolate its transmitter from its receiver during transmission. Transceivers generally also include electro-static discharge (ESD) circuitry to provide protection from ESD events and their associated transients. Such ESD circuitry is particularly important for the radio frequency (RF) input device of a transceiver, which is highly sensitive to ESD.

ESD protection is generally achieved by adding ESD protection elements to the input/output pad of a transceiver in order to divert transients caused by an ESD event to ground. One example of such an ESD protection element is the thyristor. Some sources define thyristors and silicon-controlled rectifiers (SCRs) as synonymous; others define SCRs as a subset of thyristors. Throughout this document, the term "thyristor" means both thyristors and SCRs.

Unfortunately, ESD protection elements tend to add parasitic resistance, capacitance and/or inductance to an RF circuit. Since RF circuits are extremely sensitive to any added parasitics, ESD protection at high frequencies is difficult to achieve and is as a result sometimes altogether omitted.

SUMMARY OF THE INVENTION

In one aspect of the present invention, a hybrid circuit is provided for protecting a radio-frequency input device of a communications device from a source of an electro-static discharge. The hybrid circuit includes an input node for electrically connecting the hybrid circuit between the radio-frequency input device and the source of the electro-static discharge. At least one electro-static discharge protection element is connected to the input node for diverting a transient associated with the electro-static discharge to ground. A transistor is provided for triggering the protection element. The transistor has a drain, a source and a gate. The drain is connected to the input node and the source is connected to ground. A driver circuit is connected to the gate of the transistor for driving the gate to turn the transistor on during transmission by the communications device and for driving the gate to turn the transistor off during reception by the communications device.

In another aspect of the present invention, a method is provided for combining the functions of a transmit-receive switch and an electro-static discharge protection circuit for protecting a communications device from an electrostatic discharge, wherein the communications device includes a radio-frequency input device and the protection circuit includes a thyristor triggered by a transistor. The method includes the steps of (a) driving a gate of the transistor with a control signal to turn the transistor on during transmission by the communications device and to turn the transistor off during reception by the communications device.

In yet another aspect of the present invention, a communications device is provided that includes a hybrid circuit for protecting a radio-frequency input device from a source of an electro-static discharge. The communications device includes an input node for electrically connecting the hybrid circuit between the radio-frequency input device and the source of the electrostatic discharge. A protection means is connected to the input node for diverting a transient associated with the electrostatic discharge to ground. A triggering means is provided for triggering the protection element. The triggering means has a drain, a source and a gate. The drain is connected to the input node and the source is connected to ground. A driver means is connected to the gate of the triggering means for driving the gate to turn the triggering means on during transmission by the communications device and for driving the gate to turn the triggering means off during reception by the communications device.

BRIEF DESCRIPTION OF THE DRAWINGS

FIG. 3b illustrates a cross-sectional view of the SCR/thyristor and GGMOS implemented in a CMOS technology as illustrated in FIG. 3a.

FIG. 3c illustrates a cross-sectional view of a generic SCR/thyristor as illustrated in FIG. 3a.

DETAILED DESCRIPTION

Reference will now be made in detail to embodiments of the disclosed invention, one or more examples of which are illustrated in the accompanying drawings. Each example is provided by way of explanation of the present technology, not limitation of the present technology. In fact, it will be apparent to those skilled in the art that modifications and variations can be made in the present technology without departing from the spirit and scope thereof. For example, features illustrated or described as part of one embodiment may be used in another embodiment to yield a still further embodiment. Thus, it is intended that the present subject matter covers such modifications and variations as come within the scope of the appended claims and their equivalents.

Figure 1:
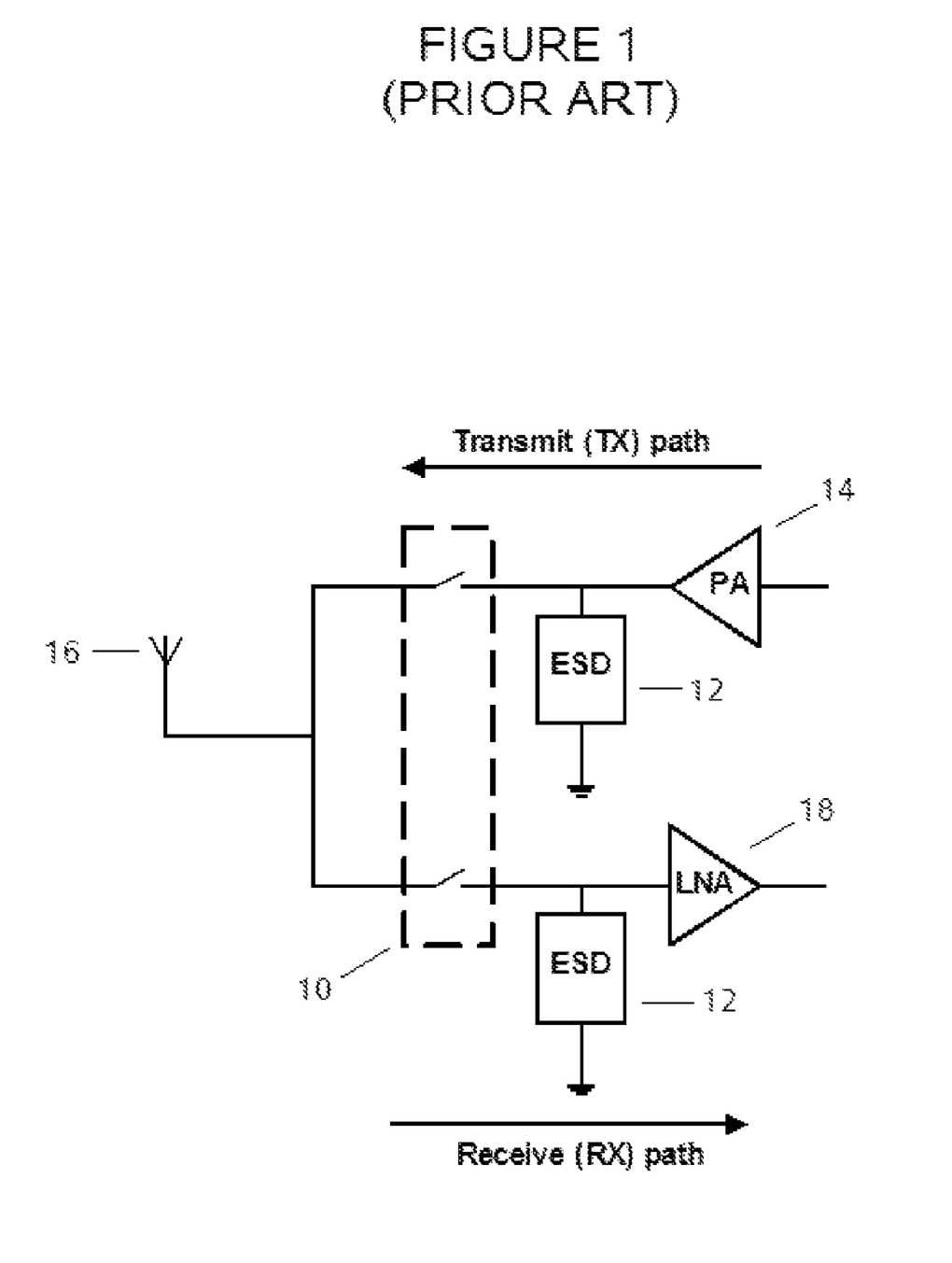
FIG. 1 illustrates a prior art implementation of a TX/RX switch combined with ESD protection circuitry.

FIG. 1 illustrates a prior art implementation of a TX/RX switch 10 and ESD protection circuitry 12 for use in the transmit and receive paths of a transceiver. An antenna 16 is provided for transmitting and receiving radio-frequency signals over the transmit and receive paths. The final stage of the transmit path includes a power amplifier (PA) 14. Additional elements that may typically be included in the transmit path of a transceiver are not illustrated. The initial stage of the receive path includes a low noise amplifier (LNA) 18. Additional elements that may typically be included in the receive path of a transceiver are not illustrated.

During transmission, the TX/RX switch 10 closes over the transmit path and opens over the receive path. This isolates the receive path from the signals being transmitted. During reception, the TX/RX switch 10 opens over the transmit path and closes over the receive path. This isolates the transmit path from the signals being received. A first ESD protection circuit 12 is generally connected between the transmit path and ground. A second ESD protection circuit 12 is connected between the receive path and ground. The ESD protection circuits 12 shunt transients that result from an ESD event to ground in order to protect downstream circuitry.

Figure 2A:
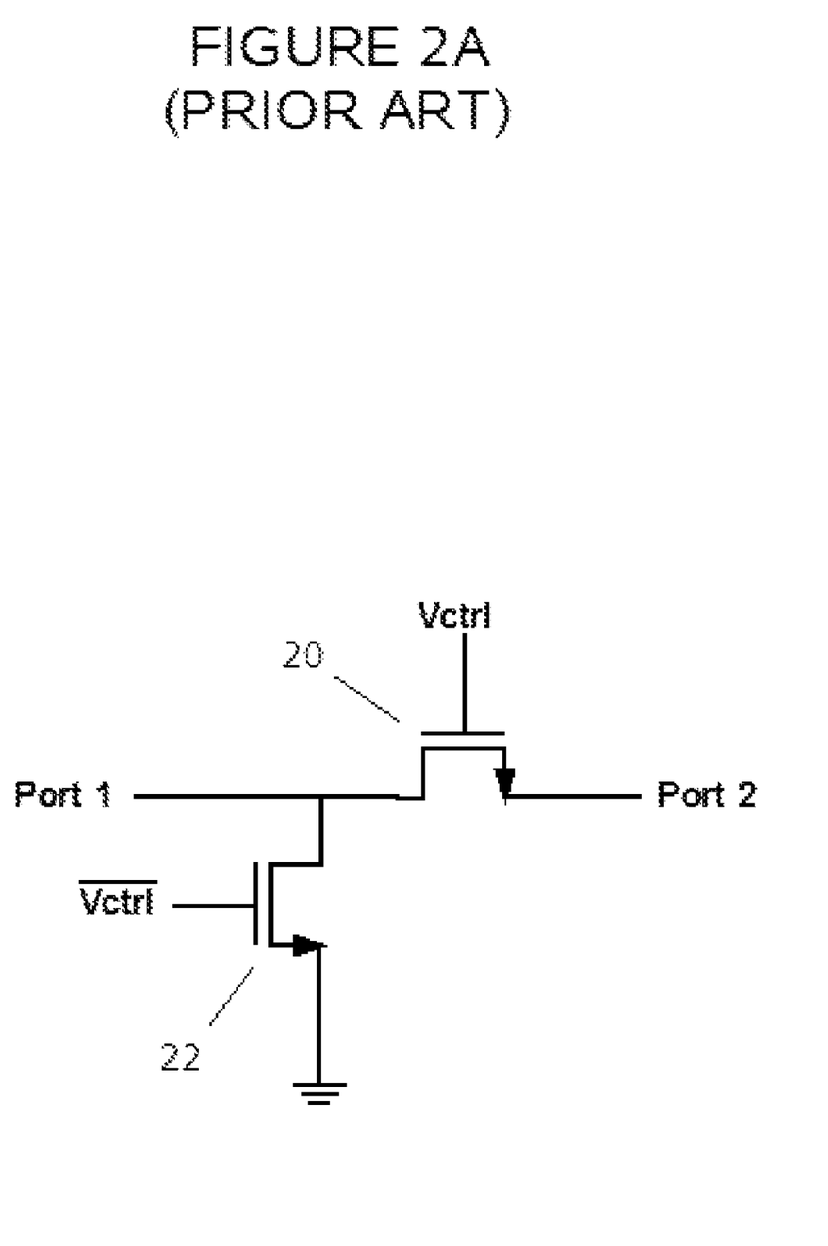
FIGS. 2A and 2B illustrate examples of prior art implementations of switches for use in the TX/RX switch illustrated in FIG. 1.

FIG. 2A illustrates an example of a prior art implementation of a switch for use in the TX/RX switch 10 illustrated in FIG. 1. A TX/RX switch would normally utilize two of the switches shown in order to switch both the transmit path and the receive path. The switch illustrated in FIG. 2A includes two transistors 20, 22 that are controlled by a control signal Vctrl. The transistors may be formed from various transistor technology, including but not limited to metal-oxide semiconductor (MOS) transistors and bipolar transistors. When the switch passes signals from Port 1 to Port 2, transistor 20 is turned on and transistor 22 is turned off. When the switch blocks signals between Port 1 and Port 2, transistor 20 is turned off and transistor 22 is turned on.

Figure 2B:
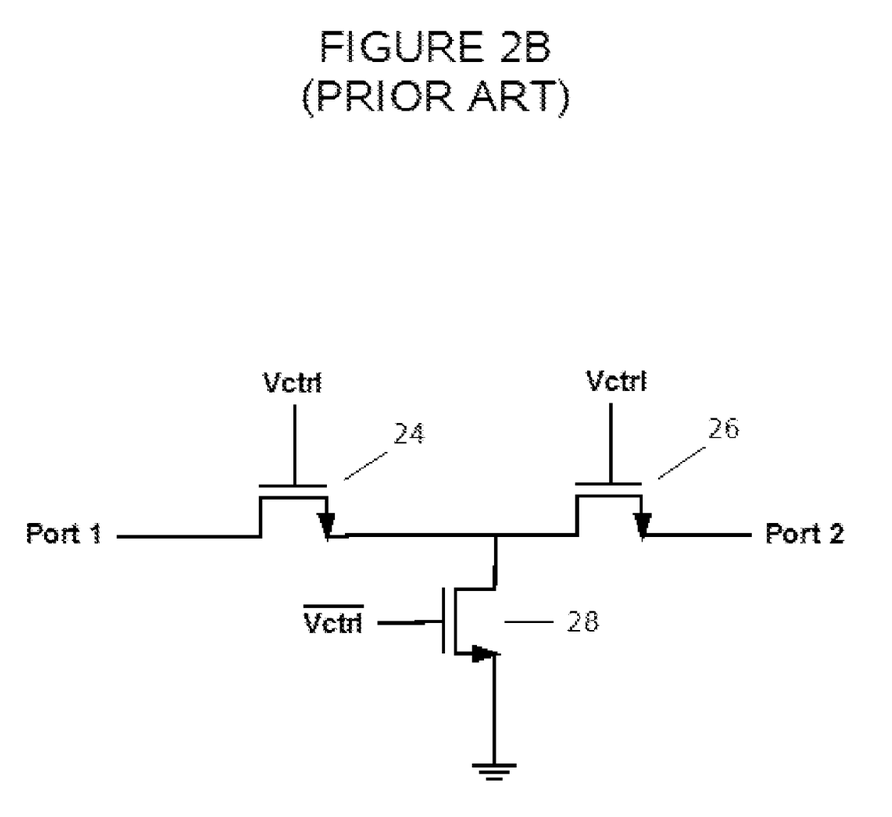

FIG. 2B illustrates a second example of a prior art implementation of a switch for use in the TX/RX switch 10 illustrated in FIG. 1. Again, a typical TX/RX switch would utilize two of the switches shown. The switch illustrated in FIG. 2B includes three transistors 24, 26, 28 that are controlled by a control signal Vctrl. The transistors may be formed from various transistor technology. In order to pass a signal from Port 1 to Port 2, transistor 24 and transistor 26 are turned on and transistor 28 is turned off. In order to block a signal between Port 1 and Port 2, transistor 24 and transistor 26 are turned off and transistor 28 is turned on.

Figure 3A:
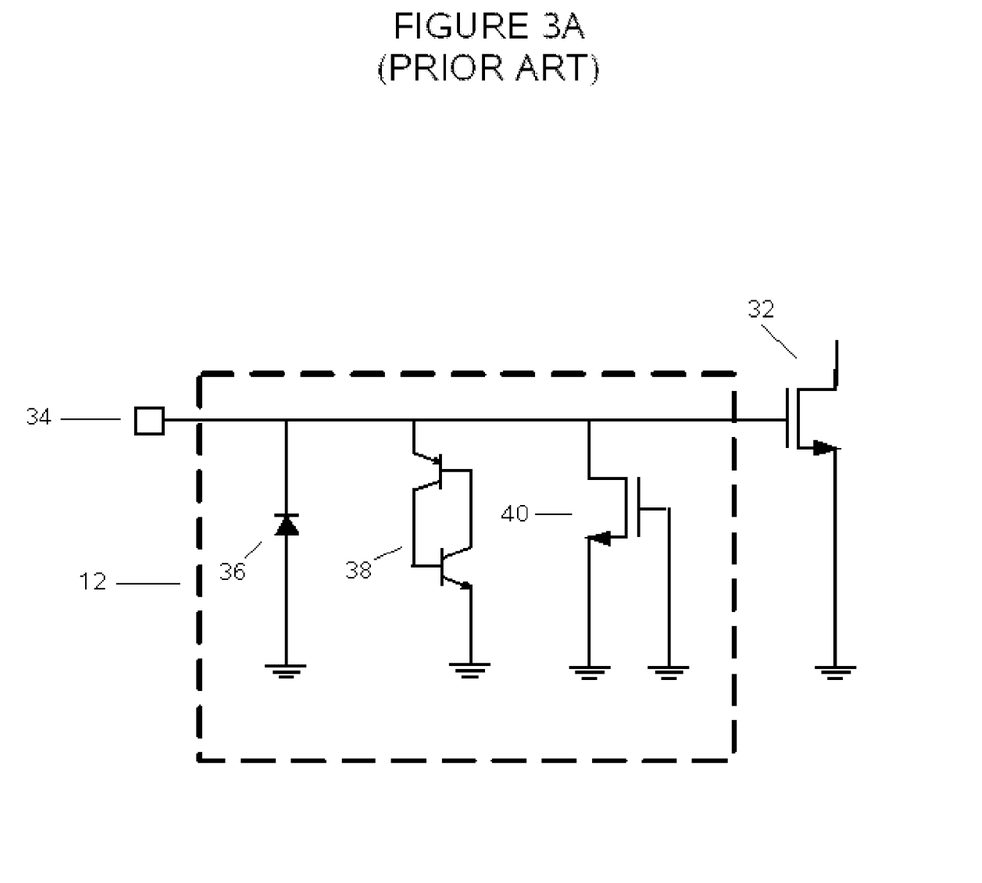
FIG. 3a illustrates a prior art implementation of the ESD protection circuitry illustrated in FIG. 1.

FIG. 3A illustrates a prior art implementation of the ESD protection circuit 12 illustrated in FIG. 1. The input node of the ESD protection circuit 12 is connected between the source of ESD events 34—such as a pad—and a device to be protected 32—such as an RF input device. The ESD protection circuit 12 may include various ESD protection elements. For purposes of illustration, the ESD protection circuit 12 is shown to include a clamping diode 36, a silicon-controlled rectifier (SCR)/thyristor 38 and a grounded gate MOS (GG-MOS) transistor 40. The clamping diode 36 and SCR/thyristor 38 provide protection against an ESD event by clamping the voltage associated with such an event. The GGMOS transistor 40 serves to trigger the SCR/thyristor 38 in order to shunt transients related with the ESD event to ground.

Figure 3B:
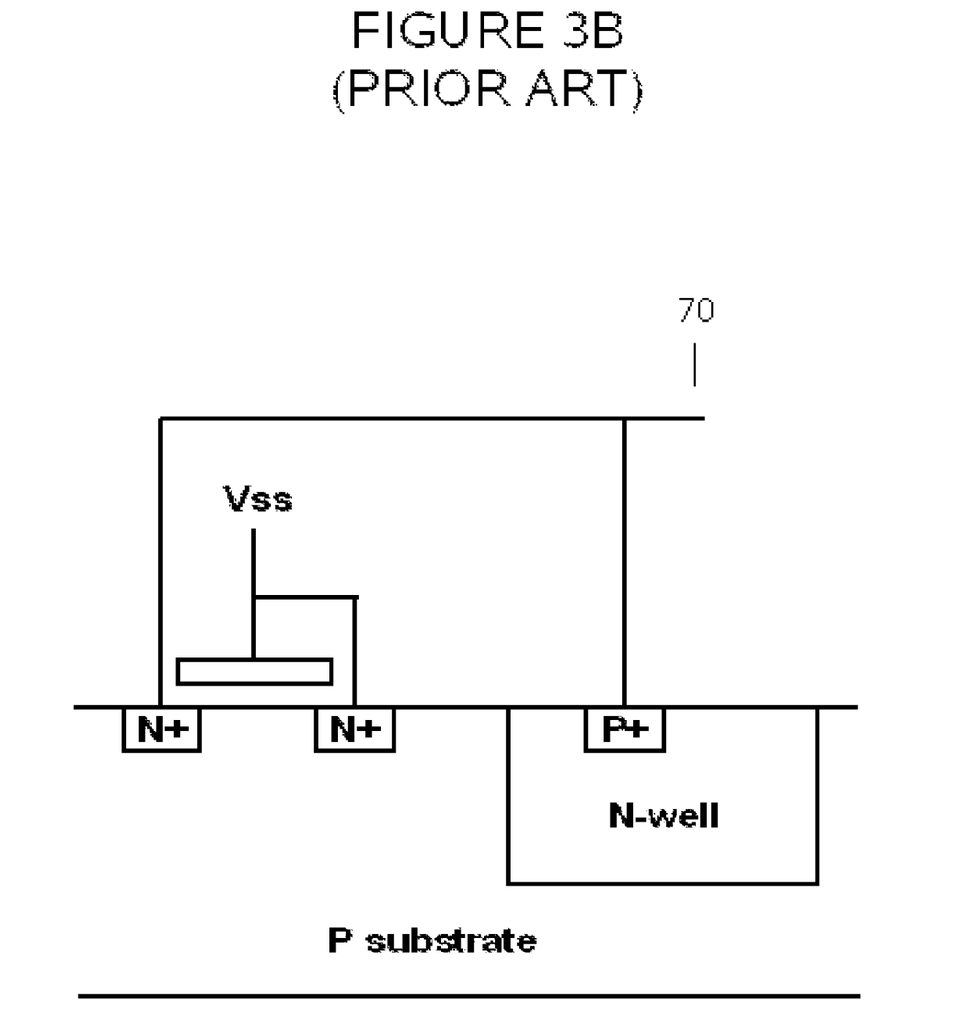

FIG. 3B shows the cross-sectional view of the thyristor and the GGMOS of FIG. 3A when implemented in complementary MOS (CMOS) technology. The thyristor and GGMOS are configured to protect an input node 70. Although CMOS technology is shown, it should be noted that the components may be implemented using other transistor technologies. A PNP transistor is formed from the p+ diffusion, the n-well and the p-substrate. An NPN transistor is formed from the n-well, p-substrate and the n+ diffusion connected to the voltage source Vss. A grounded gate is formed between the n+ wells. The layout and location of the grounded gate are selected as design parameters of the thyristor triggering circuit.

Figure 3C:
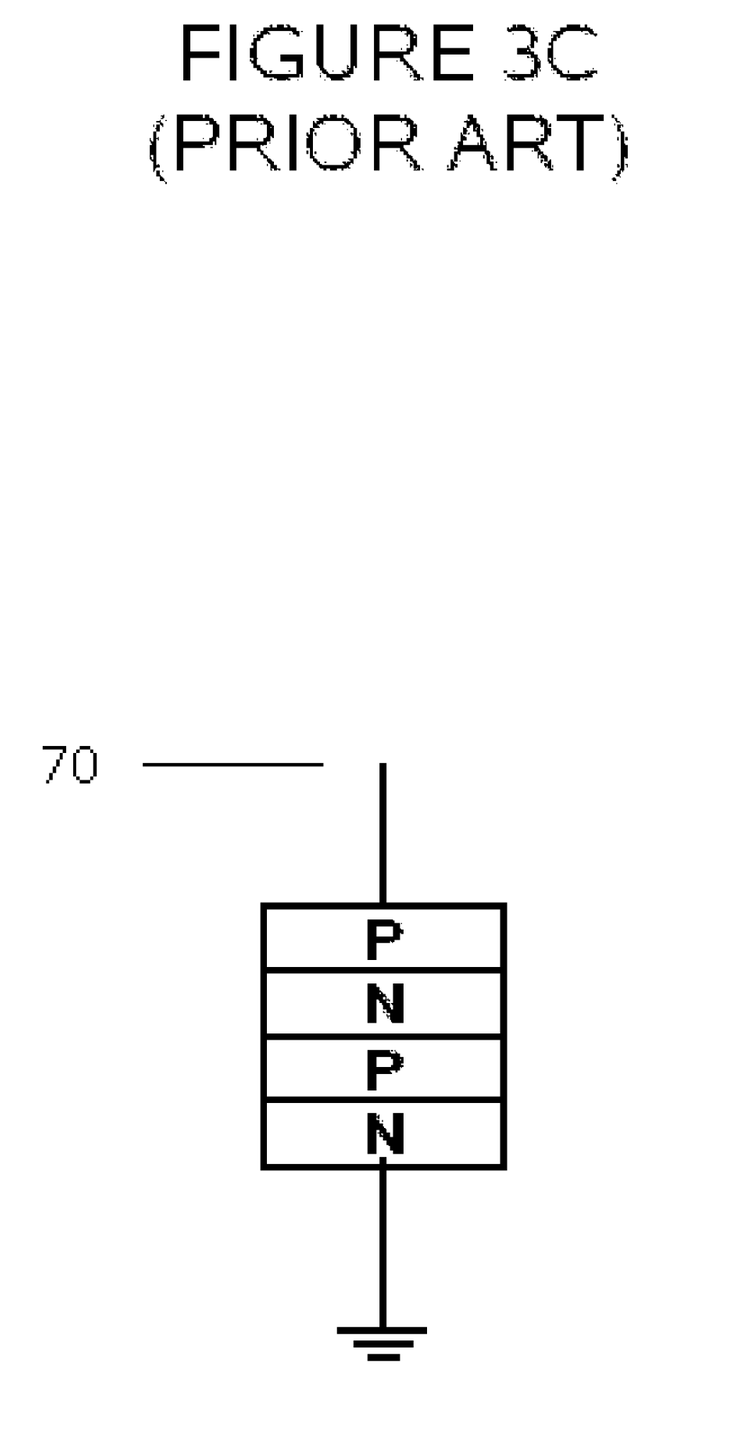

FIG. 3C illustrates the effective thyristor of FIG. 3B as a series of P and N sections connected in series between an input node 70 and ground.

Figure 4:
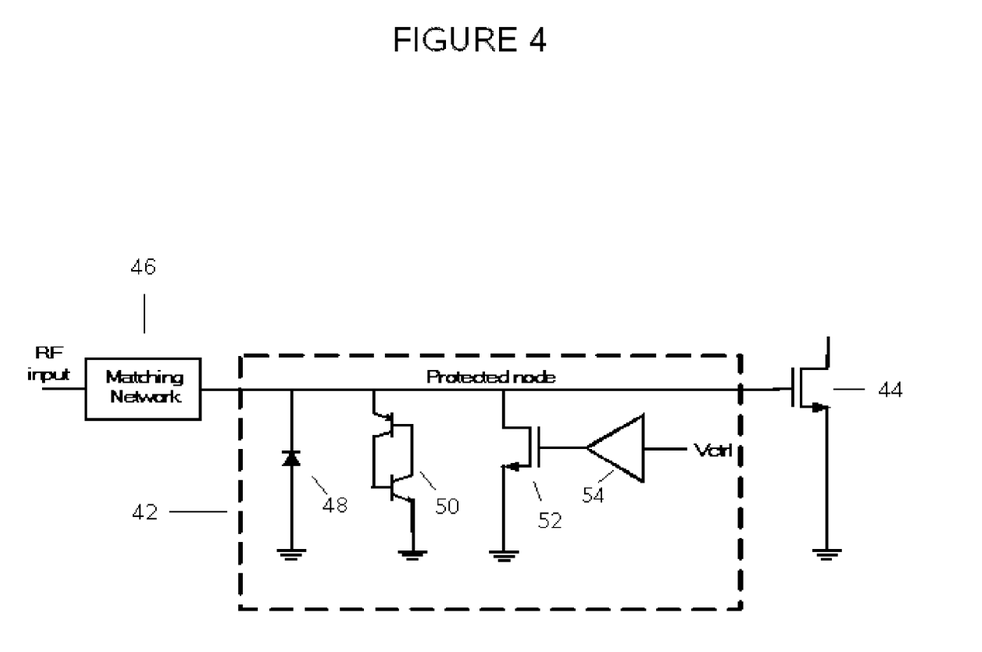
FIG. 4 illustrates the receive path of a transceiver that includes a hybrid circuit that is consistent with the present invention.

FIG. 4 illustrates the receive path of a transceiver that includes a hybrid circuit 42 that is consistent with the present invention. The input node (or protected node) of the hybrid circuit 42 is downstream of a matching network 46 and upstream of a device to be protected 44. For purposes of illustration, the hybrid circuit 42 is shown with a clamping diode 48, an SCR/thyristor 50 and a triggering transistor 52. Additional ESD protection elements may be added and some elements may be removed from the hybrid circuit 42 without deviating from the scope and spirit of the invention.

The hybrid circuit 42 and the matching network 46 eliminate the need for a separate TX/RX switch and ESD protection circuit by incorporating the function of the TX/RX switch into the structure of the ESD protection circuit. The incorporation of the TX/RX switch function into the ESD structure also reduces parasitics in the receive path in order to provide better performance, lower losses and lower power consumption. In the hybrid circuit 42, the gate of the triggering transistor 52 is connected to a driver 54, rather than being connected to ground. The driver 54 is controlled by a control signal Vctrl, which may be, for example, a digital control signal. The control signal Vctrl controls the driver 54 to turn the triggering transistor 52 on and off. This enables the triggering transistor 52 to be converted into a voltage-controlled impedance during the normal operation of the associated transceiver. During reception, the triggering transistor 52 is turned off, providing a low loss path between the RF input and the RF input device 44. During transmission, the triggering transistor 52 is turned on. During an ESD event, the transient associated with the ESD event still activates the triggering transistor 52 to trigger the SCR/thyristor 50. The ESD protection function is thus achieved without the need for a separate, dedicated ESD protection circuit.

Figure 5:
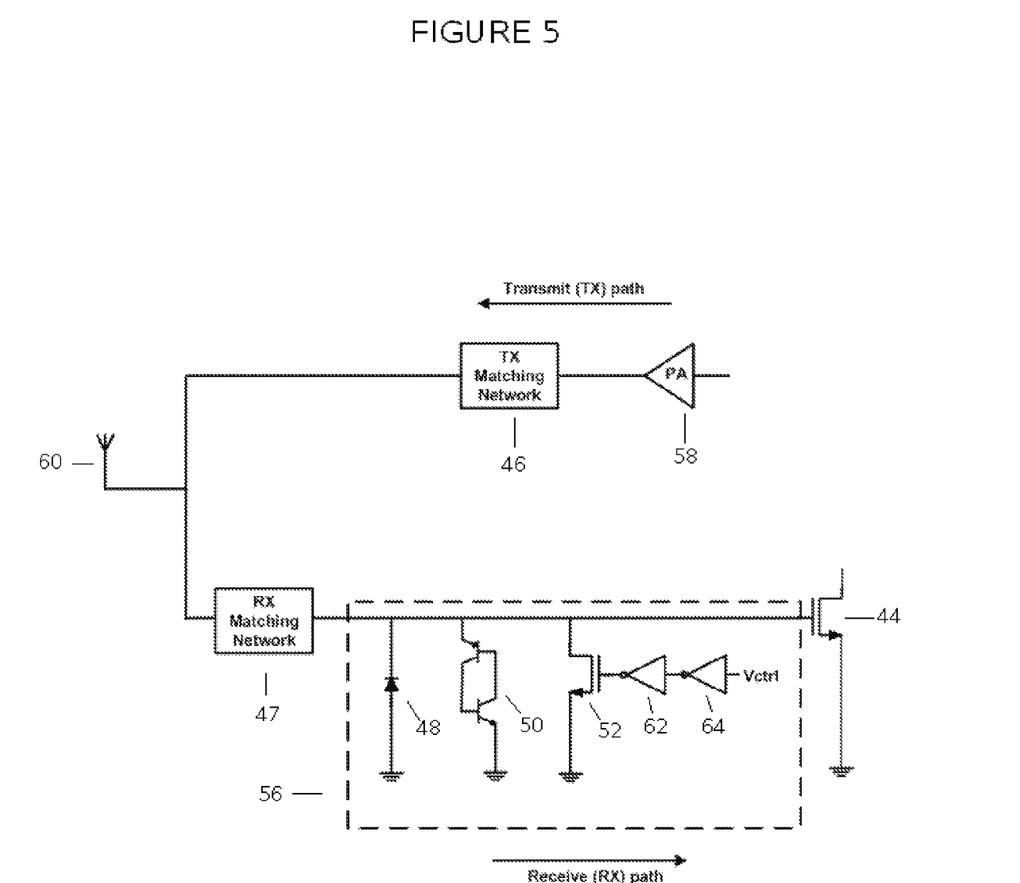
FIG. 5 illustrates both the receive and transmit paths of an exemplary embodiment of a hybrid circuit that is consistent with the present invention.

FIG. 5 illustrates both the receive path and the transmit path of a transceiver incorporating an exemplary embodiment of a hybrid circuit 56 that is consistent with the present invention. The input node of the hybrid circuit 56 is connected to the receive path upstream of a device to be protected 44. For purposes of illustration, the device to be protected 44 is shown as an RF input device. The transmit path of the transceiver includes a PA 58 and a TX matching network 46. The receive path of the transceiver includes an RX matching network 47. The RX matching network 47 in combination with the hybrid circuit 56 isolate the receive path from the transmit path. The hybrid circuit 56 may include various electrostatic discharge protection elements for diverting transients associated with an ESD event. For illustrative purposes, the hybrid circuit 56 is shown with a clamping diode 48, an SCR/thyristor 50 and a triggering transistor 52. A driver is connected to the gate of the triggering transistor 52. The driver may be, for example, a buffer formed from two inverters 62, 64. During transmission, the triggering transistor 52 and the RX matching network 47 serve two functions: (1) to present a high impedance to the PA 58 so that most of the power of the PA 58 is directed to the antenna 60 and (2) to limit the voltage swing at the gate of the RF input device 44 to less than its maximum operating voltage by forming a voltage divider between the impedance of the matching network and the impedance of the triggering transistor 52.

Figure 6:
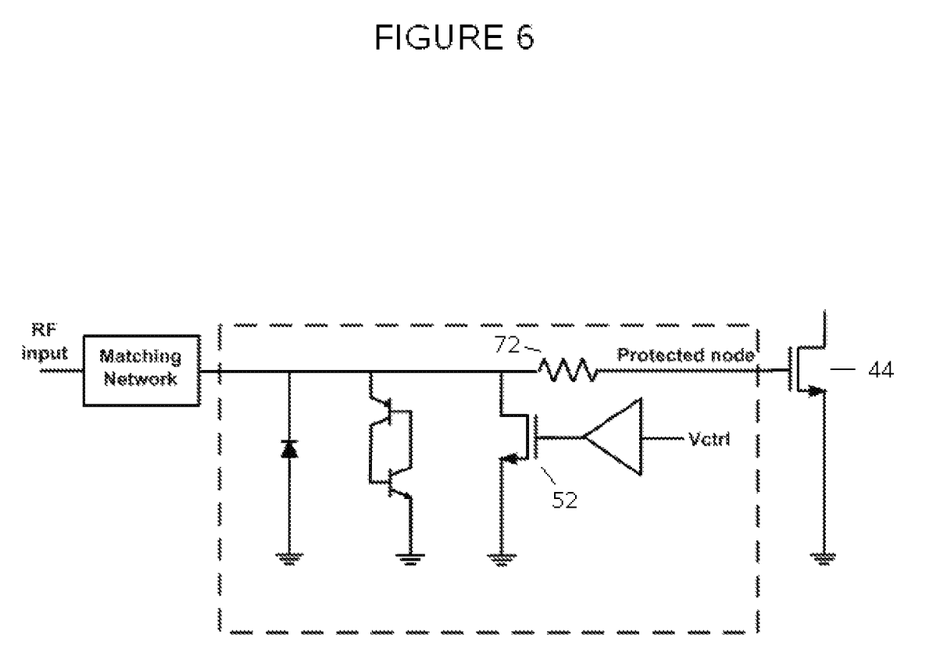
FIG. 6 illustrates an additional embodiment of the hybrid circuit that includes a series resistor.

FIG. 6 illustrates an additional exemplary embodiment of a hybrid circuit that includes a series resistor 72. The series resistor 72 may be added between the triggering transistor 52 and the device being protected 44. The series resistor 72 provides for more stringent ESD protection for the device being protected 44.

Figure 7:
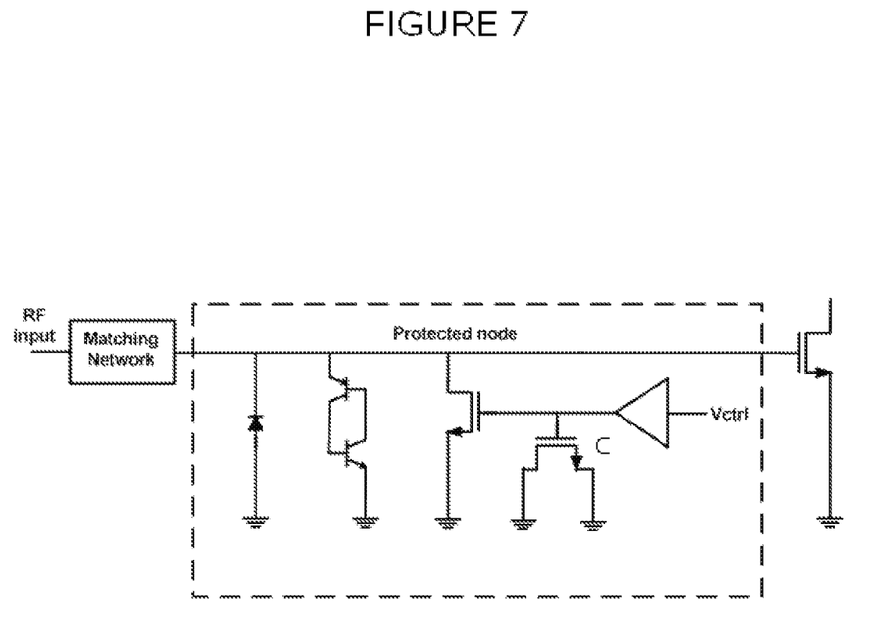
FIG. 7 illustrates an additional embodiment of the hybrid circuit that includes a gate capacitor.

FIG. 7 illustrates an additional exemplary embodiment of a hybrid circuit that includes a gate capacitance C. The capacitance C maintains the voltage of the gate of the triggering transistor at a lower voltage during an ESD event. A native thin oxide device with a large width W and length L (e.g. W=10 um, and L=2 um), for example, will maintain the gate of the triggering transistor at a potential that is close to ground during an ESD event. The gate capacitance caused by the capacitance C does not affect the capacitance of the ESD protection circuit as seen by the pad.

Although the invention has been discussed primarily with respect to specific embodiments thereof, other variations are possible. For example, the invention may be implemented using transistor technology other than MOS technology, such as bipolar technology. In addition, the steps associated with methods described herein may be added to, taken from or modified from the steps in this specification without deviating from the scope of the invention. Those of skill in the art will also appreciate that methods and apparatuses consistent with the present invention are suitable for use in a wide range of applications, including but not limited to communications systems such as mobile telephony systems, WiFi systems, cable systems and Bluetooth systems.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention.

What is claimed is:

1. A hybrid device for protecting a radio-frequency input of a communications device from a radio frequency power transmission of a transmitter during a transmit mode of operation, and from electro-static discharge during both a receive mode of operation and the transmit mode of operation, said hybrid device comprising:
    at least one electro-static discharge protection element connected to the radio-frequency input of the communications device and adapted for diverting a transient associated with the electro-static discharge to a ground;
    a shunt switching transistor having a drain coupled to the radio-frequency input of the communications device, a source connected to the ground, and a gate connected to a control signal, wherein the control signal turns on the shunt switching transistor when in the transmit mode of operation and turns off the shunt switching transistor when in the receive mode of operation;
    wherein the at least one electro-static discharge protection element is operational for preventing damaging electro-static discharge whether the shunt switching transistor is on or off; and
    a matching network coupled between an antenna connection and the drain of the shunt switching transistor, the antenna connection is also coupled to an output of the transmitter,
        wherein when the shunt switching transistor is on the matching network presents a high impedance at the antenna connection for frequencies of the radio frequency power transmission, thereby substantially reducing an amplitude of the radio frequency power transmission at the radio-frequency input of the communications device, and
        wherein when the shunt switching transistor is off the matching network presents a low impedance at the antenna connection for low loss reception of radio frequency signals by the communications device.

2. The hybrid circuit of claim 1 wherein the at least one electro-static discharge protection element comprises a thyristor.

3. The hybrid circuit of claim 1 wherein the shunt switching transistor comprises a metal-oxide semiconductor (MOS) transistor.

4. The hybrid circuit of claim 1 further comprising a driver circuit coupled between the gate of the shunt switching transistor and the control signal.

5. The hybrid circuit of claim 1 further comprising a voltage-clamping diode connected between the input of the communications device and the ground for clamping a voltage associated with the electro-static discharge.

6. The hybrid circuit of claim 1 further comprising a resistor connected in series between the drain of the shunt switching transistor and the radio frequency input of the communications device.

7. The hybrid circuit of claim 1 further comprising a capacitor for maintaining a voltage at the gate of the shunt switching transistor at a low voltage during the electro-static discharge.

8. A method of combining the functions of a transmit-receive switch and an electrostatic discharge protection circuit for protecting a communications device from an electro-static discharge, said communications device including a radio-frequency input device, a matching network coupled between the radio-frequency input device and an antenna connection and said protection circuit including a thyristor triggered by a triggering transistor having a drain connected to the radio-frequency input device and a source connected to a ground, the method comprising the steps of:
    driving a gate of said triggering transistor with a control signal at a first logic level to turn said triggering transistor on during transmission by said communications device; and
    driving the gate of said triggering transistor with the control signal at a second logic level to turn said triggering transistor off during reception by said communications device, wherein the matching network is at a high impedance at the antenna connection when the control signal turns on said triggering transistor and the matching network is at a low impedance at the antenna connection when the control signal turns off said triggering transistor, thereby protecting the radio-frequency input device from damage from the transmission by communications device coupled to the antenna connection.

9. The method of claim 8 further comprising clamping a voltage associated with said electro-static discharge with a voltage-clamping diode connected between an input node of said an electro-static discharge protection circuit and said ground.

10. The method of claim 8 further comprising further isolating said radio-frequency input device from said electro-static discharge with a resistor connected in series between said transistor and said radio frequency input device.

11. The method of claim 8 further comprising maintaining a voltage of said gate of said triggering transistor at a low voltage during said electro-static discharge with a capacitor connected to said gate of said triggering transistor.

12. A communications device including a hybrid device for protecting a radio-frequency input of a receiver of the communications device from a radio frequency power transmission of a transmitter of the communications device during a transmit mode of operation, and from electro-static discharge during both a receive mode of operation and the transmit mode of operation, said communications device comprising:
- an electro-static protection circuit connected to the radio-frequency input of the receiver and adapted for diverting a transient associated with the electro-static discharge to a ground;
- a trigger circuit for triggering the electro-static protection circuit, the trigger circuit having a drain coupled to the radio-frequency input of the receiver and a source connected to the ground;
- a driver circuit having an output coupled to a gate of the trigger circuit and an input coupled to a control signal, wherein the control signal turns on the trigger circuit when in the transmit mode of operation and turns off the trigger circuit when in the receive mode of operation;
- wherein the at least one electro-static discharge protection element is operational for preventing damaging electro-static discharge whether the trigger circuit is on or off;
- an output of the transmitter is coupled to an antenna; and
- a matching network is coupled between the antenna and the drain of the trigger circuit,
  - wherein when the trigger circuit is on the matching network presents a high impedance at the antenna for frequencies of the radio frequency power transmission, thereby substantially reducing an amplitude of the radio frequency power transmission at the radio-frequency input of the receiver, and
  - wherein when the trigger circuit is off the matching network presents a low impedance at the antenna for low loss reception of radio frequency signals by the receiver.

13. The communications device of claim 12 wherein the electro-static protection circuit comprises a thyristor.

14. The communications device of claim 12 wherein the trigger circuit comprises a metal-oxide semiconductor (MOS) transistor.

15. The communications device of claim 12 wherein the driver circuit comprises a buffer formed from two inverters controlled by the control signal.

16. The communications device of claim 12 further comprising a voltage-clamping diode connected between the radio-frequency input f the receiver and the ground for clamping a voltage associated with the electro-static discharge.

17. The communications device of claim 12 further comprising a resistor connected in series between the trigger circuit and the radio frequency input of the communications device.

18. The communications device of claim 12 further comprising a capacitor for maintaining a voltage at the gate of trigger circuit at a low voltage during said electro-static discharge.

* * * * *